(12) United States Patent
Goldstein

(10) Patent No.: US 6,571,788 B1
(45) Date of Patent: Jun. 3, 2003

(54) ELECTRIC BELLOWS SYSTEM

(76) Inventor: David Goldstein, 134 Keystone Dr., Enid, OK (US) 73703

( * ) Notice: Subject to any disclaimer, the term of this patent is extended or adjusted under 35 U.S.C. 154(b) by 77 days.

(21) Appl. No.: 09/853,214

(22) Filed: May 11, 2001

(51) Int. Cl.⁷ ............................................. F23M 3/18
(52) U.S. Cl. ................................................ 126/25 B
(58) Field of Search ...................... 126/25 B; 417/411, 417/423.1; 415/159

(56) References Cited

U.S. PATENT DOCUMENTS

| | | | | |
|---|---|---|---|---|
| 2,192,732 A | * | 3/1940 | Johnson | 126/25 B |
| 2,950,669 A | * | 8/1960 | Terry | 126/25 B |
| 3,334,214 A | * | 8/1967 | Davidson | 110/309 |
| 3,347,220 A | * | 10/1967 | Barbera | 126/25 B |
| 3,697,198 A | * | 10/1972 | Holder, Jr. | 110/327 |
| 4,044,750 A | * | 8/1977 | Zeigler | 126/25 B |
| 4,190,034 A | * | 2/1980 | Wonisch | 126/25 B |
| 4,516,561 A | * | 5/1985 | Stawski et al. | 126/25 B |
| 4,810,173 A | * | 3/1989 | Thomson et al. | 126/25 B |
| 5,115,566 A | * | 5/1992 | Zeitlin | 30/142 |

* cited by examiner

*Primary Examiner*—Henry Bennett
*Assistant Examiner*—Alfred Basichas

(57) ABSTRACT

An electric bellows system for stimulating and igniting a fire includes a funnel. The funnel has a central axis with a circular intake end of a larger diameter and a circular exhaust of a smaller diameter and a tapered region therebetween. The first region is tapered in a convex fashion. The second region diminishes in a concave fashion. A screen covers the intake end of the base region of the funnel. A battery housing comprises a cylindrical tube with a short longitudinal slit therethrough. An axial fan has a central base with an axial bore. The axial fan also has a plurality of blades coupled to the base. A switch is coupled to the tube of the battery housing adjacent the slit.

4 Claims, 3 Drawing Sheets

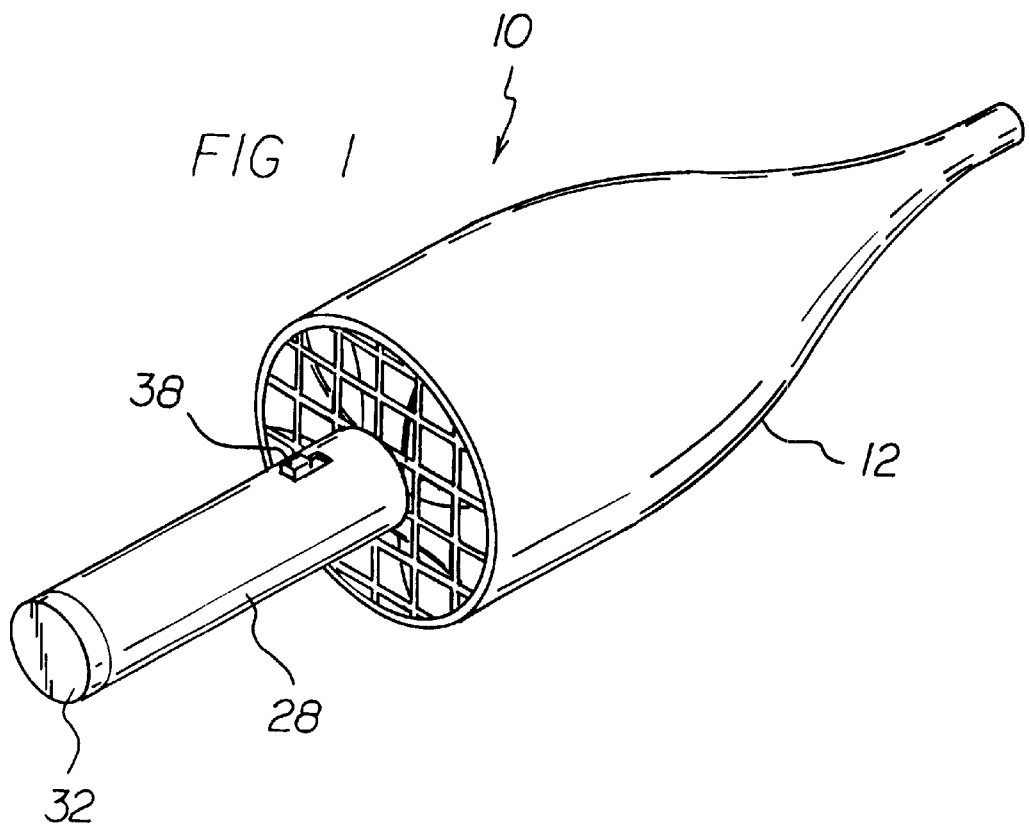
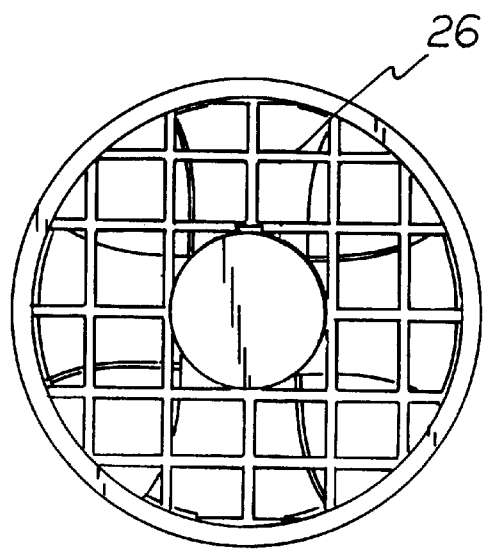

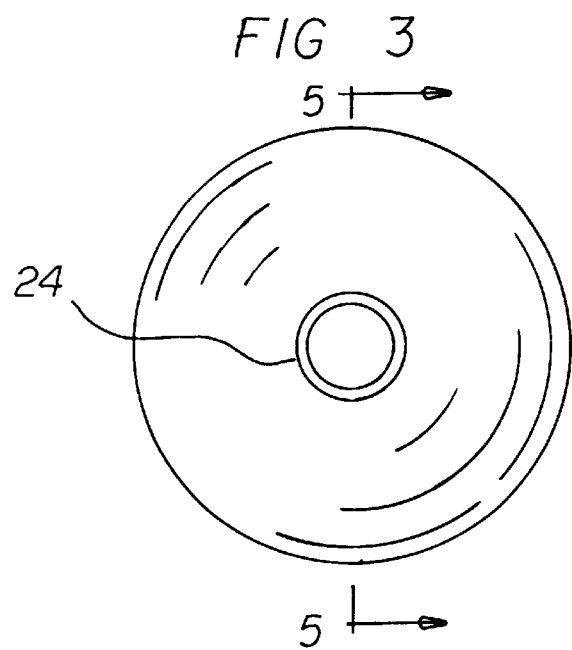
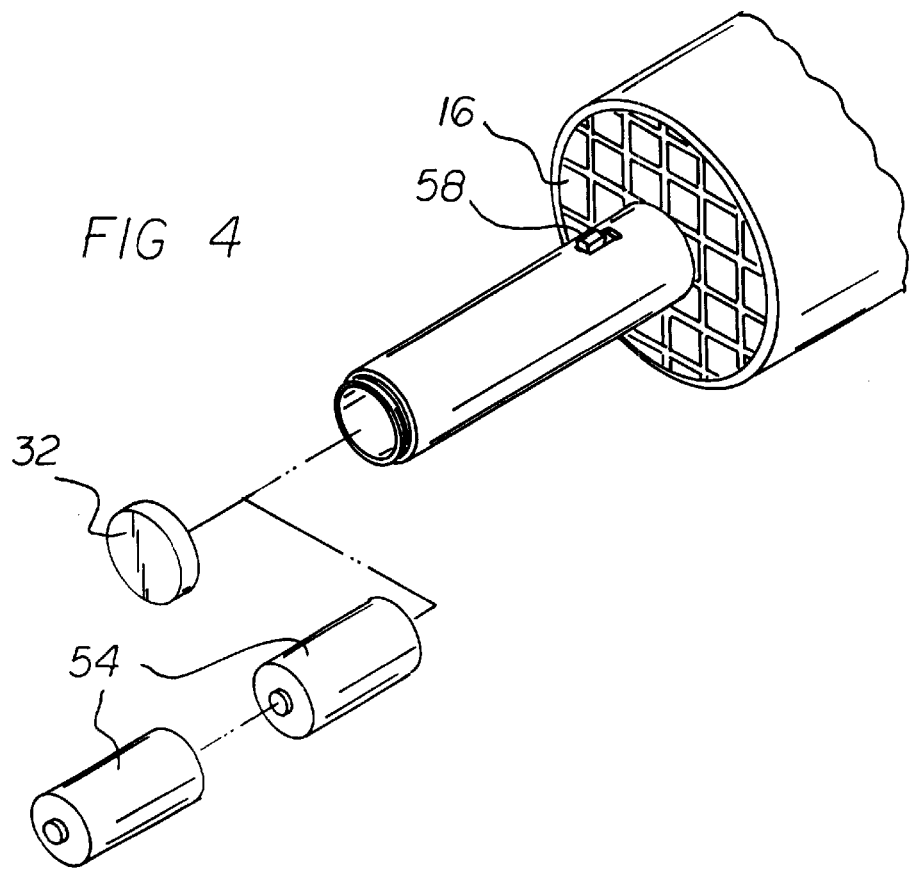

ELECTRIC BELLOWS SYSTEM

BACKGROUND OF THE INVENTION

1. Field of the Invention

The present invention relates to an electric bellows system and more particularly pertains to stimulate and ignite a fire in a safe and efficient manner.

2. Description of the Prior Art

The use of bellows of known designs and configurations is known in the prior art. More specifically, bellows of known designs and configurations previously devised and utilized for the purpose of stimulating fires through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,336,158 to Huggins et al discloses a pneumatic vacuum. U.S. Pat. No. 4,190,034 to Wonisch discloses an apparatus for starting and fanning a fire.

While these devices fulfill their respective, particular objectives and requirements, the aforementioned patents do not describe an electric bellows system that allows for stimulating and igniting a fire in a safe and efficient manner.

In this respect, the electric bellows system according to the present invention substantially departs from the conventional concepts and designs of the prior art, and in doing so provides an apparatus primarily developed for the purpose of stimulating and igniting a fire in a safe and efficient manner.

Therefore, it can be appreciated that there exists a continuing need for a new and improved electric bellows system which can be used for stimulating and igniting a fire in a safe and efficient manner. In this regard, the present invention substantially fulfills this need.

SUMMARY OF THE INVENTION

In view of the foregoing disadvantages inherent in the known types of bellows of known designs and configurations now present in the prior art, the present invention provides an improved electric bellows system. As such, the general purpose of the present invention, which will be described subsequently in greater detail, is to provide a new and improved electric bellows system and method which has all the advantages of the prior art and none of the disadvantages.

To attain this, the present invention essentially comprises an electric bellows system for stimulating and igniting a fire in a safe and efficient manner including a funnel for accelerating the air passing through the system. The funnel has a central axis with a cylindrical base region. The base region has a circular intake end. The base region further has a diameter of about 5⅜ inches plus or minus 10 percent and an axial length of about 36.7 percent of the total funnel length and measuring about 4½ inches plus or minus 10 percent. The funnel further has a sloping tapered region with a first and second region of equal length. The tapered region has a beginning diameter similar to that of the cylindrical base region and reducing to a tip having a diameter of ⅜ inch plus or minus 10 percent. The tapered region has a length measuring 7¾ inches plus or minus 10 percent. The first region of the tapered region diminishes in a convex fashion and the second region diminishes in a concave fashion. The system also includes a screen covering the intake end of the base region of the funnel and being of a rigid construction being adapted to support the weight of the system and the force of the air current upon it. The screen is further adapted to keep foreign debris out of the funnel. The system further has a battery housing comprising of a cylindrical tube with a releasably coupled rear face and a fixed front face with central bore therethrough. The tube also has a short longitudinal slit therethrough starting at a location ⅜ inch from the front face. The battery housing also has a diameter of 11/16 inch plus or minus 10 percent and a length of 6 inches plus or minus 10 percent. The surface of the battery housing is knurled to provide a secure and comfortable grip. The battery housing is adapted to be mounted to the center of the screen. The system also has a rheostat motor that is coupled to the battery housing adjacent the front face. The motor has an electrical connection and a drive shaft. The drive shaft is adapted to extend through the central bore of the front face of the battery housing. The motor has a diameter less than that of the tube of the battery housing and a length of 9/16 inch plus or minus 10 percent. The system also has an axial fan. The fan has a central base and a plurality of blades coupled thereto. The central base has an axial bore and is adapted to receive the drive shaft of the motor. The system further includes a plurality of batteries which have an electrical connection and are adapted to provide energy to the system. The batteries further are held in electrical communication with each other. The system also includes a switch. The switch is coupled to the tube of the battery housing adjacent the slit. The switch has electrical contact and is in electrical communication with the electrical connections of the motor and the batteries. The switch is adapted to slide between ON and OFF orientations within the slit.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electric bellows system which has all of the advantages of the prior art bellows of known designs and configurations and none of the disadvantages.

It is another object of the present invention to provide a new and improved electric bellows system which may be easily and efficiently manufactured and marketed.

It is further object of the present invention to provide a new and improved electric bellows system which is of durable and reliable constructions.

An even further object of the present invention is to provide a new and improved electric bellows system which is susceptible of a low cost of manufacture with regard to both materials and labor, and which accordingly is then susceptible of low prices of sale to the consuming public, thereby making such an electric bellows system economically available to the buying public.

Even still another object of the present invention is to provide an electric bellows system for stimulating and igniting a fire in a safe and efficient manner.

Lastly, it is an object of the present invention to provide a new and improved electric bellows system for stimulating and igniting a fire including a funnel. The funnel has a central axis with a circular intake end of a larger diameter and a circular exhaust of a smaller diameter and a tapered region therebetween. The first region is tapered in a convex fashion. The second region diminishes in a concave fashion. A screen covers the intake end of the base region of the funnel. A battery housing comprises a cylindrical tube with a short longitudinal slit therethrough. An axial fan has a central base with an axial bore. The axial fan also has a plurality of blades coupled to the base. A switch is coupled to the tube of the battery housing adjacent the slit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is perspective illustration of the preferred embodiment of the present invention.

FIG. 2 is an end view of the battery housing of the preferred embodiment of the present invention.

FIG. 3 is an end view of the funnel of the preferred embodiment of the present invention.

FIG. 4 is a perspective illustration of the batteries and the battery housing.

The same reference numerals refer to the same parts throughout the various Figures.

DESCRIPTION OF THE PREFERRED EMBODIMENT

Figure 5:
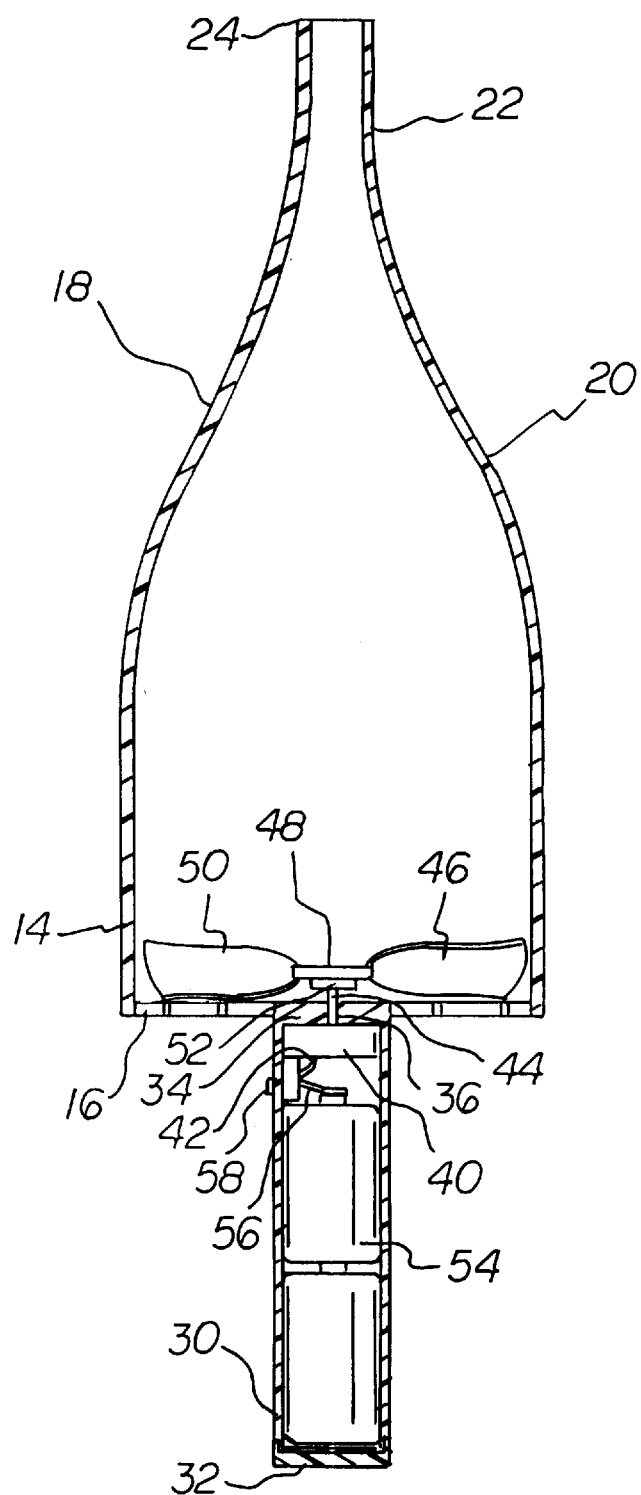
FIG. 5 is a cross section view of the FIG. 3 taken along line 5—5.

With reference now to the drawings, and in particular to FIG. 1 thereof, the preferred embodiment of the new and improved electric bellows system embodying the principles and concepts of the present invention and generally designated by the reference numeral 10 will be described.

The present invention, the electric bellows system 10 is comprised of a plurality of components. Such components in their broadest context include a funnel, a screen, a battery housing, a fan, and a switch. Such components are individually configured and correlated with respect to each other so as to attain the desired objective.

An electric bellows system 10 for stimulating and igniting a fire in a safe and efficient manner comprising a funnel 12 for accelerating the air passing through the system. The funnel has a central axis with a cylindrical base region 14. The base region has a circular intake end 16. The base region further has a diameter of about 5⅜ inches plus or minus 10 percent. The axial length measures about 4½ inches plus or minus 10 percent. The funnel further has a sloping tapered region 18 with a first region 20 and second region 22 of equal lengths. The tapered region has a beginning diameter similar to that of the cylindrical base region and reduces to a tip 24 having a diameter of ⅜ inch plus or minus 10 percent. The tapered region measures 7¾ inches plus or minus 10 percent. The first region of the tapered region diminishes in a convex fashion and the second region diminishes in a concave fashion.

The system also includes a screen 26. The screen covers the intake end of the base region of the funnel and is of a rigid construction. The screen is further adapted to support the weight of the system and the force of the air current upon it. The screen is also adapted to keep foreign debris out of the funnel.

Next the system includes a battery housing 28. The housing has a cylindrical tube 30 with a releasably coupled rear face 32 and a fixed front face 34 with a central bore 36 therethrough. The tube also has a short longitudinal slit 38 therethrough starting at a location ⅜ inch from the front face. The battery housing also has a diameter of 11/16 inch plus or minus 10 percent and a length of 6 inches plus or minus 10 percent. The battery housing is adapted to be mounted to the center of the screen. The exterior surface of the battery housing is knurled as to further provide a secure and comfortable grip.

The system further includes a rheostat motor 40. The motor is coupled to the battery housing adjacent the front face. The motor has an electrical connection 42 and a drive shaft 44. The drive shaft is adapted to extend through the central bore of the front face of the battery housing. The motor has a diameter less than that of the tube of the battery housing and a length of 9/16 inch plus or minus 10 percent.

Also included in the system is an axial fan 46. The fan has a central base 48 and a plurality of blades 50 coupled thereto. The central base has an axial bore 52 and is adapted to receive the drive shaft of the motor.

The system further includes a plurality of batteries 54. The batteries have an electrical connection 56 and are adapted to provide energy to the system. The batteries are held in electrical communication with each other.

In addition, the system includes a switch 58. The switch is coupled to the tube of the battery housing adjacent the slit. The switch has electrical contact and is in electrical communication with the electrical connections of the motor and the batteries. The switch is adapted to slide between ON and OFF orientations within the slit.

The present invention will prevent a user from having to hyperventilate, fan or pump an old fashioned hand operated bellows. The present invention will provide for quickly igniting fires by supplying concentrated air to hot embers or coals. A Rheostat style switch will allow for a controlled airflow. The present invention's optimal use would be combined with fireplaces, campfires and charcoal grills. The screen also provides a degree of defense against fingers entering the fan blades. The grip is of a knurled form to provide comfort to the user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electric bellows system for stimulation and igniting a fire in a safe and efficient manner comprising, in combination:

a funnel for accelerating the air passing through the system, the funnel having a central axis with a cylindrical base region, the base region having a circular intake end perpendicular to the central axis, the base region further having a diameter of about 5⅜ inches plus or minus 10 percent and an axial length of about 4½ inches plus and minus 10 percent, the funnel further having a sloping tapered region with smooth curves and with a first and second region of equal length, the tapered region having a beginning diameter similar to that of the cylindrical base region and reducing to a tip having a diameter of ⅜ inches plus or minus 10 percent, the tapered region having a length measuring 7¾ inches plus and minus 10 percent, the first region of the tapered region diminishing in a convex fashion and the second region diminishing in a concave fashion;

a screen covering the intake end of the base region of the funnel and being of a rigid construction and adapted to support the weight of the system and the force of the air current upon it, the screen being further adapted to keep foreign debris out of the funnel;

a battery housing comprising a cylindrical tube with an outer knurled surface, the housing having a releasably coupled rear face and a fixed front face with a central bore therethrough, the tube also having a short longitudinal slit therethrough starting at a location ⅜ inch from the front face, the battery housing also having a diameter of 11/16 inch plus or minus 10 percent and a length of 6 inches plus or minus 10 percent, the battery housing adapted to being mounted to the center of the screen;

a rheostat motor coupled to the battery housing adjacent the front face, the motor having an electrical connection and a drive shaft, the drive shaft adapted to extend through the central bore of the front face of the battery housing, the motor having a diameter less than that of the tube of the battery housing and a length of 9/16 inch plus or minus 10 percent;

an axial fan having a central base and a plurality of blades coupled thereto, the blades being in close proximity to the screen and rotatable in a plane perpendicular to the central axis, the central base having an axial bore and being adapted to receive the drive shaft of the motor;

a plurality of batteries having an electrical connection and being adapted to provide energy to the system, the batteries further being held in electrical communication with each other; and a switch being coupled to the tube of the battery housing adjacent the slit, the switch having electrical contact and being in electrical communication with the electrical connections of the motor and the batteries, the switch being adapted to slide between ON and OFF orientations within the slit and providing various amounts of power between the two orientations.

2. An electric bellows system for stimulating and igniting a fire comprising:

a funnel having a central axis with a circular intake end of a larger diameter perpendicular to the central axis and a circular exhaust perpendicular to the central axis of a smaller diameter and with a tapered region with smooth curves therebetween, the first region being of a tapered convex fashion and the second region diminishing in a concave fashion;

a screen covering the intake end of the base region of the funnel;

a battery housing comprising a cylindrical tube, the tube having a short longitudinal slit therethrough;

an axial fan having a central base and a plurality of blades coupled thereto the blades being in close proximity to the screen and rotatable in a plane perpendicular to the central axis, the central base having an axial bore; and a switch being coupled to the tube of the battery housing adjacent the slit.

3. The system as set forth in claim 2 and further including:

a plurality of batteries having an electrical connection and being adapted to provide energy to the system, the batteries further being held in electrical communication with each other.

4. The system as set forth in claim 2 wherein:

the funnel has a base region having an axial length of about 36.7 percent of the total funnel length;

the tapered region has a length of about 63.7 percent of the total funnel length;

the total axial length of the funnel comprises about 66.6 percent of the length of the total system; and the length of the battery housing is about 33.4 percent of the total length of the total system.

* * * * *